(No Model.)
F. M. ANABLE.
DEVICE FOR CATCHING STOCK.
No. 390,331. Patented Oct. 2, 1888.
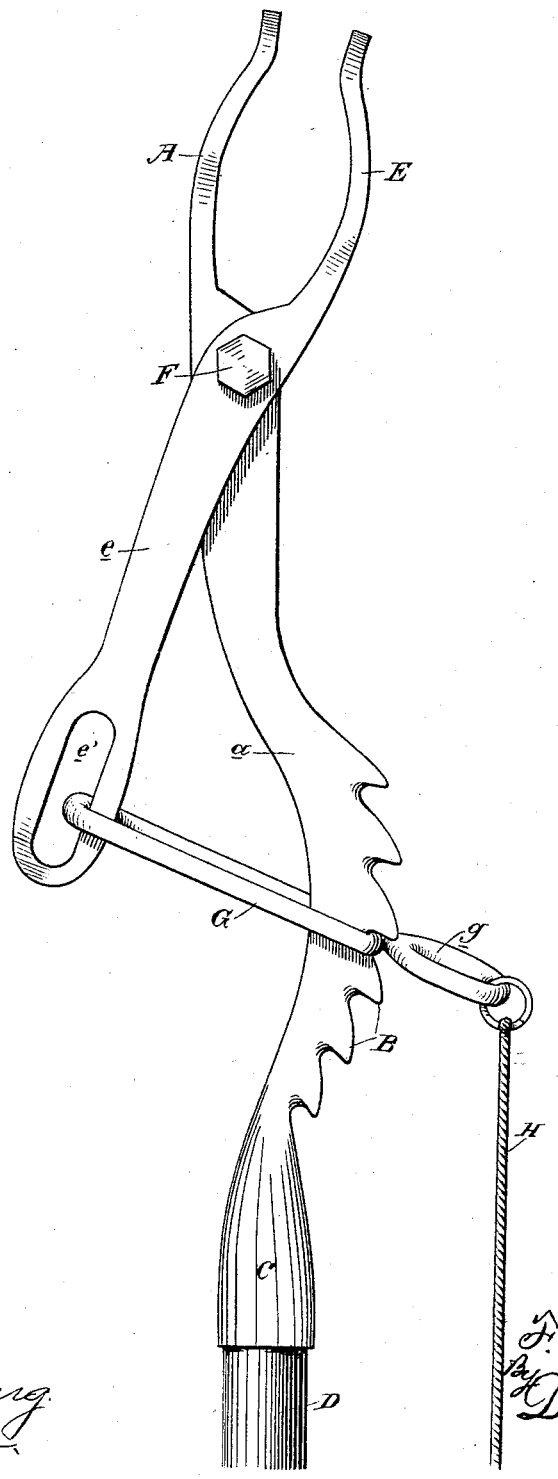
Witnesses,
Geo. L. Strong
J. L. Hurse
Inventor,
F. M. Anable
By Dewey & Co
attys

UNITED STATES PATENT OFFICE.

FRANCIS MARIAN ANABLE, OF ROCKLIN, CALIFORNIA.

DEVICE FOR CATCHING STOCK.

SPECIFICATION forming part of Letters Patent No. 390,331, dated October 2, 1888.

Application filed July 5, 1888. Serial No. 279,097. (No model.)

*To all whom it may concern:*

Be it known that I, FRANCIS MARIAN ANABLE, of Rocklin, in the county of Placer and State of California, have invented an Improvement in Stock-Catchers; and I hereby declare the following to be a full, clear, and exact description thereof.

My invention relates to that class of devices for catching animals from a distance in which pivoted jaws adapted to grip the leg of the animal are extended upon a long pole and are operated by means of a cord; and my invention consists in a stock-catcher of this class, one of the jaws of which is provided on its shank or stem with ratchet-teeth, and the other jaw has connected with its end a link which embraces the shank or stem of the other jaw and engages its teeth, said link being operated by the cord attached to its free end, as I shall hereinafter fully describe.

The object of my invention is to provide a stock-catching implement which can be readily used, and when once applied is held in its position, no matter whether the animal moves from or toward the operator.

Referring to the accompanying drawing, the figure is a perspective view of my stock-catcher.

A is a jaw having a shank or stem, *a*, on one side of which are formed the ratchet teeth B, and in the end of which is the socket C for the pole D, by which the instrument is extended.

E is the opposing jaw, pivoted at F to the jaw A, and having a stem or shank, *e*, the rear end of which has an elongated slot, *e'*. In this slot is fitted a link, G, which embraces the shank or stem *a* of the jaw A and is adapted to engage its ratchet-teeth B. The free end of the link has an eye, *g*, to which the cord H is connected.

The operation of the implement is as follows: It is extended the required distance by means of the long pole, and its widely-separated jaws are made to fit about the leg of the animal. Then the cord H is pulled upon, whereby the link is drawn back over the teeth B and engage one of them, whereby the jaws are held firmly on the animal's leg.

It will be seen that if the animal moves away the jaws grip the tighter, and if he moves toward the operator they will not open, because they are held by the link engaging the ratchet-teeth.

Having thus described my invention, what I claim as new, and desire to secure by Letters Patent, is—

A stock-catcher consisting of a jaw having a shank or stem with ratchet-teeth on the side and a socket in the end of said shank or stem, a second jaw opposing the first and pivoted thereto and having a shank or stem provided with an elongated slot, a link fitted in the slot in the shank or stem of the second jaw and embracing the shank or stem of the first jaw and engaging its teeth, a pole fitted to the socket of the shank or stem of the first jaw, and a cord connected with the free end of the link, substantially as described.

In witness whereof I have hereunto set my hand.

FRANCIS MARIAN ANABLE.

Witnesses:
  STEPHEN KENDALL,
  F. B. LOWRY.